United States Patent [15] 3,707,704

Kadow [45] Dec. 26, 1972

[54] SELECTIVE CIRCUIT FOR A DATA STORER WITH OPTIONAL ACCESS

[72] Inventor: Hermann Kadow, Munich, Germany

[73] Assignee: Siemens Aktiengesellschaft, Berlin and Munich, Germany

[22] Filed: Sept. 9, 1970

[21] Appl. No.: 70,752

[30] Foreign Application Priority Data

Sept. 30, 1969 Germany ....................P 19 49 388.0

[52] U.S. Cl. ..........................340/173 R, 340/174 SC

[51] Int. Cl. ............................................G11c 11/24

[58] Field of Search ..........340/174 SC, 173 R; 320/1

[56] References Cited

UNITED STATES PATENTS

| | | | |
|---|---|---|---|
| 2,882,482 | 4/1959 | Simkins | 340/174 SC |
| 3,214,601 | 10/1965 | Christopherson | 340/174 SC |
| 3,445,777 | 5/1969 | Amodei | 340/174 SC |
| 3,354,443 | 11/1967 | Kuhlmann | 340/174 SC |
| 3,196,418 | 7/1965 | Schneberger et al. | 340/174 SC |

*Primary Examiner*—Stanley M. Urynowicz, Jr.
*Attorney*—Hill, Sherman, Meroni, Gross and Simpson

[57] ABSTRACT

A selective circuit with optional access is provided with means for preventing overload of the circuit in case of repetitive or continuous call by the same address. The prevention of overload is effected by a technique which provides a simulation of the thermal state of the circuit. Also, a control unit is provided to limit the call succession of frequently used addresses.

7 Claims, 5 Drawing Figures

INVENTOR
Hermann Kadow

BY Hill, Sherman, Meroni, Gross + Simpson ATTYS.

INVENTOR
Hermann Kadow

BY Hill, Sherman, Meroni, Gross + Simpson ATTYS.

INVENTOR
Hermann Kadow

BY Hill, Sherman, Meroni, Gross & Simpson ATTYS.

INVENTOR
Hermann Kadow

BY Hill, Sherman, Meroni, Gross & Simpson ATTYS

SELECTIVE CIRCUIT FOR A DATA STORER WITH OPTIONAL ACCESS

BACKGROUND OF THE INVENTION

1. Field of the Invention

This invention relates to circuits for selecting storage cells of a storer including control circuits to prevent overloading even upon continuous call of the selection circuits.

2. Description of the Prior Art

It is commonly known that selective circuits serve for choosing a certain storage cell from *n* storage cells of a data storer into which either a new information is to be recorded, or from which the stored information is to be read. During the recording and reading processes, differently high currents are flowing in the selective circuits, which currents are determining the design of these circuits. The dimensioning of these circuits for random access storage is particularly critical; therefore, their selective circuits are laid out in a way as if they were constantly operating. This causes a poor utilization of the electronic elements which constitute the circuits, since their permissable capacity is determined to an unproportionally high loss in an extreme case. The dimensioning of the selective circuits has hitherto been required to ensure a random access at any time. This, however, prevents the construction of faster and less expensive stores.

SUMMARY OF THE INVENTION

The invention is thus based on the primary object of preventing the drawbacks of the prior selective circuits. This objective is realized according to this invention, in a way that the selective circuits are dimensioned for an average capacity with a low duty factor which corresponds to a normal operation of the storage — and do not become overloaded with regard to power.

The invention thereby starts from the point of view that during a normal operation of a random access storage, the called addresses change continuously since each computer operation requires a change of address. Only in an unfortunate case or in a test case too, it is possible one and the same address is continuously ordered more than any period of time, and thus corresponding one and the same selective circuit is operated continuously.

The instant invention is also based on the further object to provide a circuit arrangement for the production of a control signal monitoring circuit arrangement which prevents the selective circuits from overload and damaging. This object is achieved, according to this invention, by means of the provision of an imitation of the thermic behavior of a selective circuit, particularly with a timing circuit made of resistors and a capacitor, whereby the latter simultaneously forms an analog store for the call succession of an address of the data store, by means of the provision of a threshold circuit for the evaluation of a thermal threshold and by means of a control unit for the limitation of the call succession of certain addresses. This technique renders possible the dimensioning of the selective circuits on the basis of an essentially lower loss. Besides other random access storages, this is particularly advantageous for word-organized magnetic-wire storage the control of which can then also be executed in an integrated circuit construction. The foregoing can fulfill one of the demands which are unalterably made for a fast and inexpensive memory.

A further development of the invention is characterized by the provision and utilization of an AND circuit for the logical linkage of an address signal and a timing signal, the complementary outlets of which circuit are connected respectively with the bases of two transistors whose emitters are connected to a negative operating voltage via a joint emitter resistor, by a timing circuit, consisting of a parallel-connected capacitor and a second resistor which is interconnected between the collector of the transistor, which transistor is conductive in the operative state, and earth potential, and by a threshold circuit including an inverter circuit the input of which is connected with an adjustable tap of the resistor of the timing circuit. Even if it would be possible in principle to assign such a control device to each selective circuit, such seems to be economically impractical due to the expenditure required. The solution according to this invention, however, is essentially more advantageous to effect the control of the selective circuits when the selection of a certain storage cell from the entire number *n* of storage cells has not yet taken place. For a word-organized store with a number of *n* word lines, the equation $$n = 2^k \qquad (1)$$

is valid. This equation means that the address for a certain one of the *n* word lines can be formed by *k* bits. According to this invention, one partial circuit arrangement is respectively assigned to one of the *k* address bits or, when the positive and the negative signal state — corresponding to the logical "0" and the logical "1" respectively—of an address bit is used to define different addresses one pair of circuit arrangements is assigned respectively, for the production of a control signal. Thus, the expense for such control devices can be held as low as possible.

BRIEF DESCRIPTION OF THE DRAWINGS

A better understanding of the invention, its organization, construction and operation may be had from preferred embodiments which are explained in detail below with the help of the accompanying drawings, in which.

DESCRIPTION OF THE PREFERRED EMBODIMENTS

Figure 1:
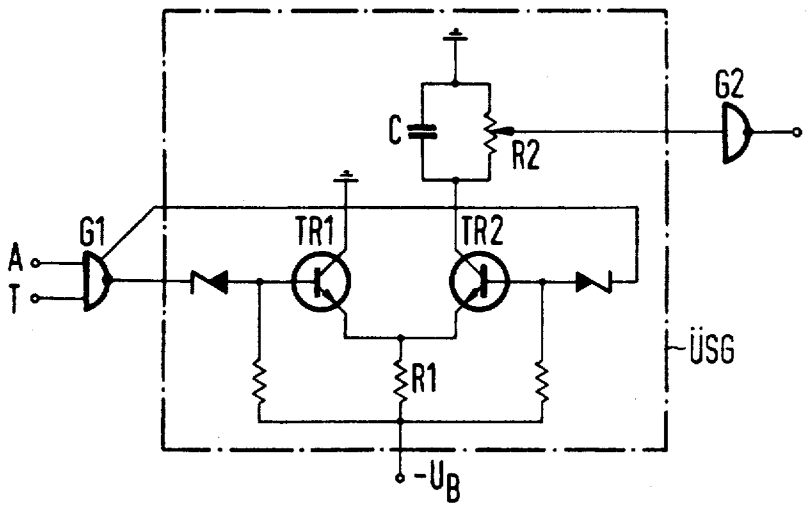
FIG. 1 illustrates in schematic form a partial circuit of a circuit arrangement according to this invention for the production of a control signal, which is to be assigned to one of the signal states of an address signal.

In a partial circuit of a monitoring circuit arrangement shown in FIG. 1, an address signal according to the state of one of the $k$ address bits is fed to the AND circuit G1 via the input A, and via the input T a timing signal is fed to the AND circuit G1. This address signal at the inlet A corresponds, for instance, to the positive signal state of one of $k$ address positions, (i.e. input A is turned on whenever the one address bit, which is associated with this partial circuit is in its positive state). The timing signal which is fed to the input T solves two tasks: fist it determines a certain instant at which the address signal is to become effective; and furthermore, a certain operational state of the store is simulated by means of the pulse duration of the timing signal, which operational state might consist of a pure succession of recording or reading processes, but which might also consist of a succession of recording and reading processes. Both signals are logically linked by means of the AND circuit G1 and they operatively control a transistor TR2 as long as the timing signal is applied thereto. Thereby, the base of the transistor TR2 is connected with the noninverted output of the AND circuit G1, via a breakdown diode. The transistor TR1 is in a non-conducting state at this time since its base is connected with the inverted output of the AND circuit G1, via a further break-down diode. The emitters of both transistors TR1 and TR2 are connected to the negative operating voltage $-U_B$ via a common emitter resistor R1. A time-determining circuit-consisting of a capacitor C and an adjustable resistor R2 which are connected in parallel is arranged between the collector circuit of the second transistor TR2 and earth potential. If a pulse signal at the input A drives the transistor TR2 into the conductive state, during the time when the pulse signal is applied to the input T, the capacitor C will be placed in a charging condition. The rate of charging is determined by the time constant which results from the capacity of the capacitor C itself, and the resistance of the emitter resistor R1, the adjustable resistor R2 and the forward resistance of the transistor TR2. Mainly the choice of the magnitude of the adjustable resistor R2 offers the possibility to designate this time constant in a way that the voltage drop across the capacitor C and the resistor R2 respectively corresponds to the temperature in the critical elements of a selective circuit which is switched on by means of a given address. Such a simulation of the thermal state of a selective circuit, however, is only then correct when the thermal transforming function is proportional to the temperature of the critical elements. This is given to a practically sufficient degree with electronic elements to be in question here, such as semiconductors and resistors in which the proportionality factor is determined by the transformed power.

The AND circuit G1 blocks if there is no coincidence of address signal at input A and timing signal at input T. In this case, the transistor TR1 will be opened, and the capacitor C can discharge via the parallel-connected resistor R2. If this RC element is suitably dimensioned, this discharge process will find place analogous to the temperature drop in a selective circuit in the intervals when it is cut off from power supply. Thus, the voltage of the capacitor C represents an exact simulation of the temperature in the critical elements of a selective circuit. Or, in other words, the capacitor C forms stores in analogous form the succession of loading operations of an associated selective circuit. The thermal state of critical elements in an associated selective circuit, as caused by the duration of access and the repetition of access, is therefore reflected by the voltage stored across the capacitor C.

The voltage at capacitor C itself, or a part of it, can be used to determine whether or not in the critical element a certain given thermal limit is already exceeded. This is obtained in the circuit arrangement shown in FIG. 1 in a way that the adjustable tap of the resistor R2 is connected with the input of an inverter circuit G2. If the input signal which is fed to the inverter circuit G2 in this way, exceeds a certain input threshold value, the inverter circuit G2 will be activated and a control signal will be provided at its output, which control signal indicates that a critical threshold value of the temperature in the associated selective circuit is exceeded.

Since each of the $k$ address bits of an address has either a positive or a negative signal state at a certain point of time, to which the address signals AD$k$-P or AD$k$-N correspond two of the partial circuit arrangements which are shown in FIG. 1 must be associated with each address bit.

Figure 2:
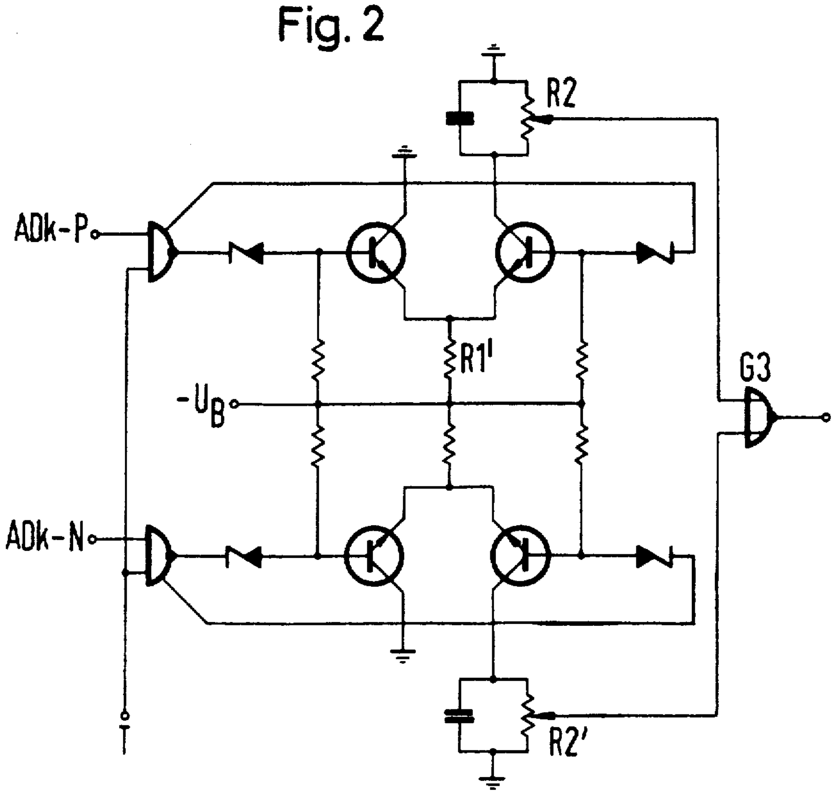
FIG. 2 shows in schematic form another embodiment of a partial circuit suited for both signal states of one of the *k* bits of the storage address.

A slightly different embodiment of such a circuit arrangement is shown in FIG. 2 which consists of two partial circuits to which the positive address signal AD$k$-P and the negative address signal AD$k$-N respectively is applied. The circuit design corresponds essentially to the circuit arrangement which is shown in FIG. 1 and was explained with the help thereof. It is therefore unnecessary to repeat the principle design and function of this circuit arrangement which is shown in FIG. 2. As distinguished from the arrangement shown in FIG. 1 merely the two emitter resistors R1 and R1' are connected in common to a negative operating voltage $-U_B$. Furthermore, the adjustable taps of the resistors R2 or R2' of the two time-determining circuits are connected with the input of a NOR circuit G3, which NOR circuit serves again as a threshold circuit for detecting the exceeding of the thermal limit of the corresponding selective circuits. The NOR circuit G3 corresponds to the inverter circuit G2 which is shown in FIG. 1, and furthermore logically links the control signals.

Figure 3:
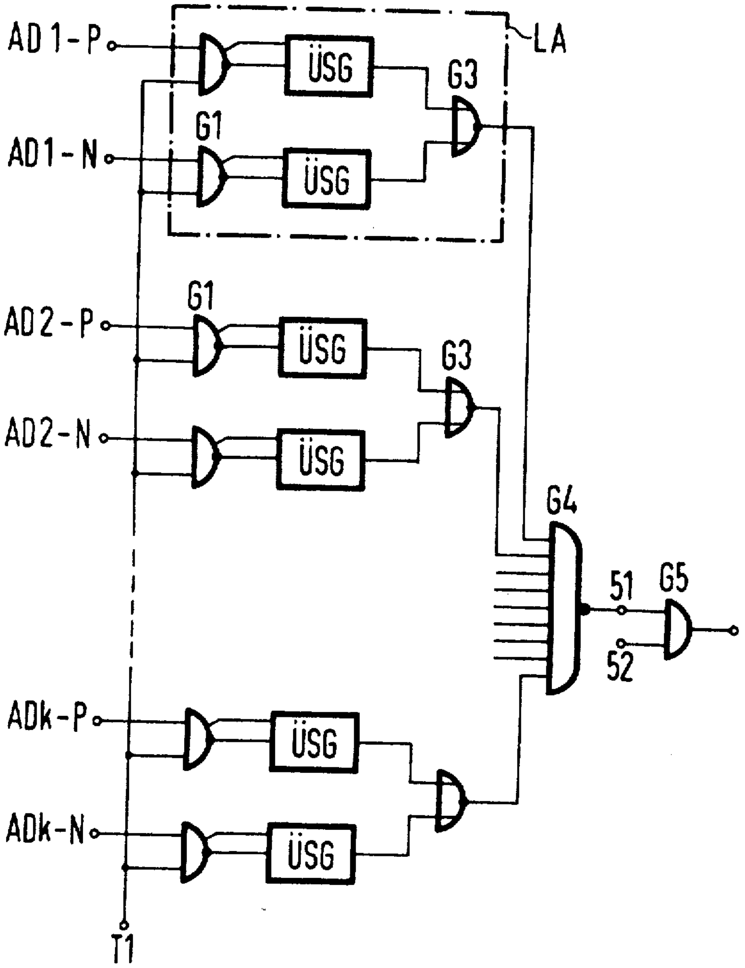
FIG. 3 is a block diagram of the entire circuit of a first embodiment for the monitoring circuit arrangement of the present invention.

The overall function of an control circuit (monitoring circuit arrangement) which is essentially an assemblance of a group of such partial circuit arrangements will become clear from the following description of the monitoring circuit arrangement as shown in FIG. 3.

In FIG. 3, the block diagram of the entire circuit of an entire control circuit has been shown from which it can be seen that a pair of partial circuit arrangements ÜSG, which are completely shown in FIG. 1, are provided for each one of the $k$ address bits of an address, which partial circuit arrangements are also called ÜSG in FIGS. 1 and 3. The signal outputs of the circuits ÜSG are linked logically with each other by the NOR circuits G3. The outputs of all NOR circuits G3 are connected with the inputs of a NAND circuit G4 which, on its part, is connected to the input 51 of an AND circuit G5. The NAND circuit G4 only then provides a signal to the AND circuit G5 when, in the case of a disturbance of during a test program, one and the same address of the random access storage is continuously ordered for access to the store and the corresponding selective circuits are thereby overloaded. An internal control signal 72 which is derived from the associated machine is fed to the other input 52 and the AND circuit G5 which control signal T2 indicates that the storage input/output control is clear for the next memory operation, such as recording or reading processes. If now a blocking signal occurs at the input 51 which is produced by the NAND circuit G4, while the control signal T2 is applied to the input 52, the AND circuit G5 will not be conductive to permit access. Thus, the random access store can be blocked for further orders. This blocking of the store is maintained so long as the voltage at a capacitor C of at least one of the partial circuits ÜSG drops beyond the threshold value, with which the assigned NOR circuit G3 can be driven. Then the NAND circuit G4 changes its state of conductance and the store is again active for further operations. Was there no change of the address and thereby the critical temperature exceeded again in the corresponding selective circuit, and the capacitor C again charged in the aforementioned partial circuit arrangement up to the critical threshold value, the corresponding NOR circuit G3 changes again to its conductive state and responding to that the NAND circuit G4 blocks at once the access to the store. If, however, the address has changed normal operation will continue without such a continued blocking of the store operation.

The invention is herein explained with the aid of a simple embodiment for a better understanding. It is abundantly clear that the ratio of actual installed capacity and the theoretically minimum admissible power capacity of the critical electronic elements in the selective circuits has an effect on the shortness of the operation time of the partial circuit arrangements ÜSG when one and the same address is continuously ordered. This is valid both with the continuous order of one address and with statistically distributed orders of a few addresses. On the other hand, a continuous intervention of the control circuit which would again and again interrupt the normal storage operation is also not desired in the interest of an optimum information flow rate. Herefrom results, that with the described sample embodiment, the actual utilized power may not be reduced to an utmost degree.

However, in contrast to the above, it is also possible to design the selective circuits for much lower powers if the number of storage operations within a certain period is reduced depending on the real case of storage operation. The most critical case of operation is if one and the same storage address is ordered continuously, i.e., if again and again the same selective circuits are actuated. In this case, the succession of storage operations within a certain period has to be strongly reduced at once if the selective circuits are not to be overloaded. However, if only two or even several addresses are called in statistic order continuously after each other, there will be short or longer recovery periods for each selective circuit which is assigned to one of the called addresses, in which period the temperature in their elements drops again to a value below the critical temperature. The ratio of operation time to rest time (i.e. the duty factor of a selective circuit) will become statistically better and better the larger the lot of the respective addresses is used within a certain number of memory cycles. The reduction of storage operations can thereby be shortened in the same ratio without overloading one of the selective circuits. In the interest of an optimum information flow rate which can be expressed by means of small average cycle time, this case of operation should also be determined over as large a number of cycles as possible. Statistically expressed this means one has to take into account as large a number of random samples as possible to receive a low random sample width.

Figure 4:
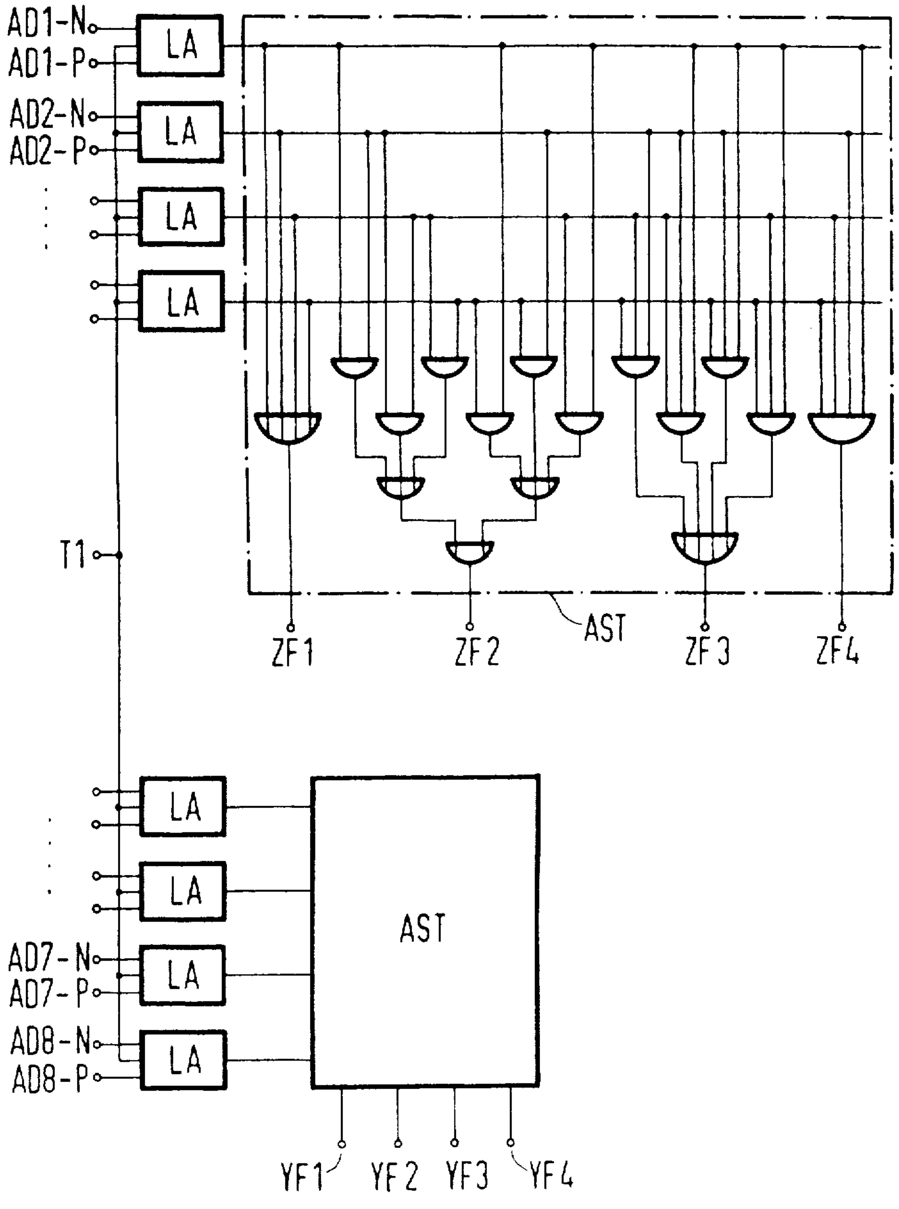
FIGS. 4 and 5 are circuit diagrams of a further embodiment for the monitoring circuit arrangement with which the number of storage operations within a certain period can be reduced in proportion to the loading of the store.
Figure 5:
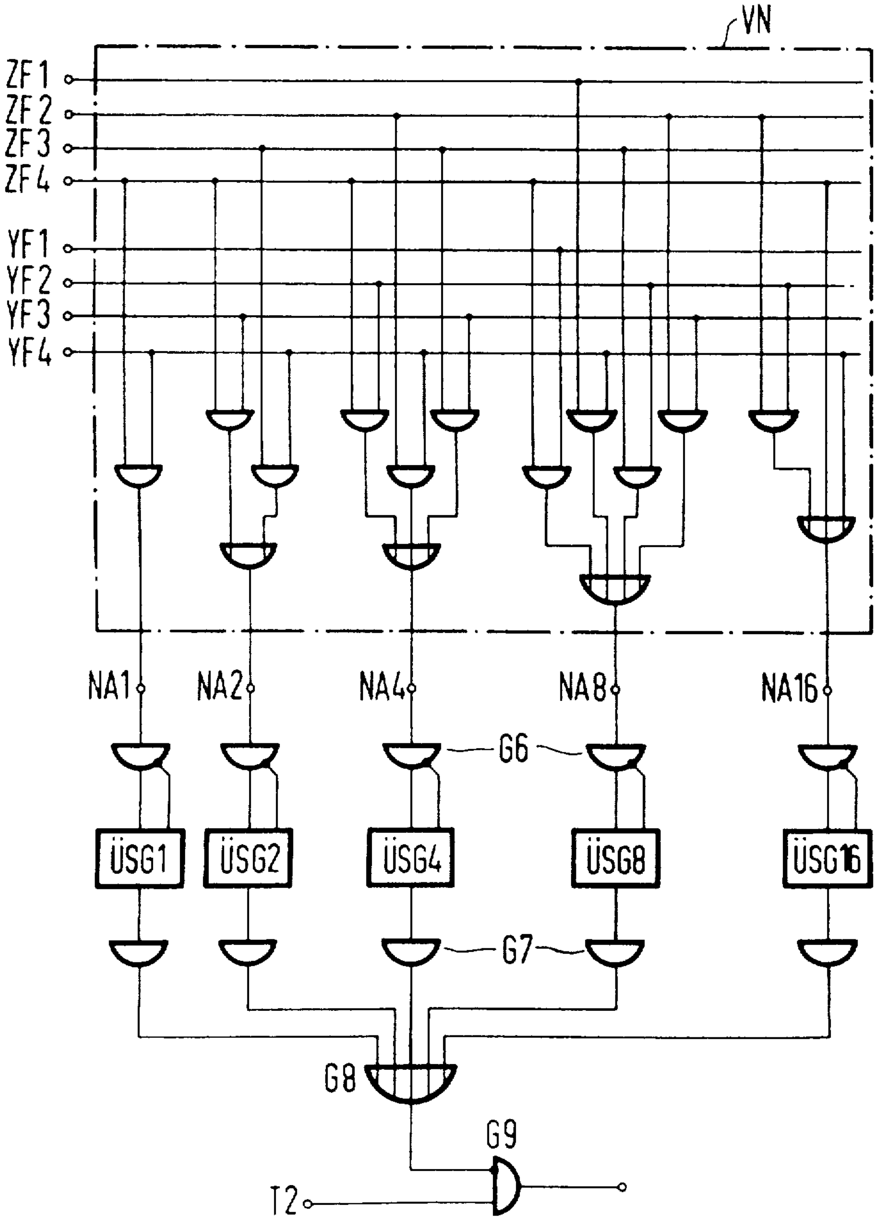

A further development of the invention which fulfills these demands is shown in FIGS. 4 and 5. This arrangement allows the application of selective circuits which are dimensioned for an essentially lower capacity (in view of the temperature function) and which can thus be easier designed as integrated circuits. The sample embodiment shown here refers to a matrix store with 256 storage cells, due to the more simple exemplary illustration. Hereto belong the corresponding relation $$n = 2^k \qquad (1)$$

applies where $k = 8$ address bits per address. If the control logic of the store is also constructed in the form of a matrix, four address bits with the respective address signals AD1 through AD8 are to be assigned to one side of the selective matrix. As it has hereinbefore been discussed with the aid of FIG. 3, a circuit LA to be composed of a pair of partial circuit arrangements for monitoring the capacity is again provided for each address bit. To find out the case of operation of the store, i.e., to determine the load (the rate of input) of certain selective circuits, the circuit arrangements LA which belong to one side of the selective matrix are connected — as is shown in FIG. 4 — to an evaluation unit AST for power control. This evaluation unit AST comprises a logical network with the aid of which it is determined whether only one, two three or all four of the power control circuits LA which are assigned to one side of the selective matrix are producing control signals (in a way which has been described herein in connection with FIG. 1 and FIG. 2). This is indicated at the four outputs ZF1, ZF2, ZF3, ZF4 or YF1, ZF2, YF3, YF4. (As apparent from a view to FIG. 4 which shows a useful embodiment of this logical network AST is the required logic to meet this object customary to one skilled in the art and therefore no further description is given.)

In order to be able to judge the state of certain elements of the selective matrix, and thus the load or operation case of the store, these evaluation signals ZF1 through ZF4 and YF1 through YF4, respectively, must be logically combined. This combination is provided with the help of a linking network VN which is shown in FIG. 5.

If one and the same address is ordered continuously, the address signals are not changed. All power control circuits LA react (with a certain time delay corresponding to the change of the RC member) and both an evaluation signal ZF4 and an evaluation signal YF4 will be produced. This mode of operation of the store and loading of certain selective circuits is detected by means of an AND linkage of both signals and a signal NA1 appears at the first of the five outputs of the linkage network VN, corresponding to the Boolean equation:

$$NA1 = ZF4 \cdot YF4 \qquad (2)$$

The interchanging access of only two storage addresses, i.e., two storage cells and the corresponding selective circuits are seized again and again, can be determined analogously according to the relation:

$$NA2 = (ZF4 \cdot YF3) + (YF4 \cdot ZF3) \qquad (3)$$

correspondingly, the following relations are valid:

$$NA4 = (ZF4 \cdot YF2) + (ZF2 \cdot YF4) + (ZF3 \cdot YF3) \qquad (4)$$

$$NA8 = (ZF4 \cdot YF1) + (ZF1 \cdot YF4) + (ZF3 \cdot YF2) + (ZF2 \cdot YF3) \qquad (5)$$

and $$NA16 = (ZF2 \cdot YF2) + (ZF4 + YF4) \qquad (6)$$

for a storage operation with the statistic change of four or eight or 16 addresses. The equations (2) to (6) are realized by means of the linking network VN at the outputs of which either one or several ones of the signals NA$i$ occur during critical cases of load. As above mentioned in view of the evaluation network AST it is also customary for one skilled in the art to design the network according to the conditions given by the logic equations 2 6 and therefore no further description is given.

With the help of these signals NA$i$, the rate of storage operations within a certain number of storage cycles is reduced correspondingly to the loading of the storage and the selective circuits respectively, to ensure, by an optimum information flow rate, that none of the selective circuits are overloaded. Thereby the secondary demand is to be fulfilled to determine the loading of the selective circuits during a period as long as possible without impairing therewith the safety of operation of the monitoring circuit. This is obtained by means of partial circuit arrangements USG$i$ which are assigned to the signals NA$i$. They are connected to the corresponding outputs of the linking network VN with complementary outputs corresponding to their ordinal number $i = 1, 4, 8,$ or 16 via logical members G6. Their outlets are connected with the inputs of an OR circuit G8 via the logical circuits G7. The logical circuits G6 and G7 correspond to the logical circuits G1 and G3 which have been explained in connection with the apparatus of FIG. 3, and they here again essentially serve as threshold circuits. The design of the partial circuit arrangements ÜSG$i$ can correspond to the circuit arrangements in FIGS. 1 or 2 with the difference that here other time conditions are realized in a way that, with a growing number of the addresses which are repeatedly ordered in a statistical sequence, the time of response of the corresponding connected partial circuit arrangement ÜSG$i$ which is assigned to the evaluation signals NA $i$, will increase and the drop-out time lag decreases. If a minimum reaction time is called $t_a$, which corresponds to the maximum admissible overload duration of a selective circuit, the partial circuit arrangements ÜSG$i$ will have reaction times of $i \cdot t_a$, corresponding to their ordial number, while the drop-out or release times are selected the opposite way, proportional to their ordial number $i$. If one or several ones of the partial circuit arrangements ÜSG$i$ emit signals in a critical loading which changes the state of conductance of the assigned logical circuits G7 signals of different lengths will also occur at the output of the OR circuit G8 corresponding to the drop-out time lags of the activated partial circuit arrangement ÜSG$i$ which signal is guided to the inverted input of an AND circuit G9. The other input of this AND circuit G9 receives an internal control signal T2 which is extended by means of a storage pulse member (not shown) and like the control signal T2 according to FIG. 2 indicates that the storage input/output control is clear for the next memory operation. That control signal T2 drives the AND circuit G9 and causes a so-called store-free signal at its output as long as no blocking signal is emitted by the OR circuit G8.

The invention is explained herein with the help of sample embodiments, however it is not limited to these. It is very well possible to simulate the thermal state of selective circuits by other electronic elements too, such as thermistors. The practical selection of the elements depends merely on the size of the necessary time constants. It can also be practical to adapt the monitoring of the selective circuits to certain cases of load not, as it has been described here, in a binary stage but to make another sub-division. This is also valid for the selection of the most preferable construction and design of the monitoring circuits which depends on the organization of the store and its control.

Many changes and modifications may be made in the invention by those skilled in the art without departing from the spirit and scope of the invention, and it is to be understood that I wish to include within the scope of the patent warranted on this invention all changes and modifications as may reasonably and properly be included within the scope of my contribution to the art.

What I claim is:

1. A selective circuit for a random access memory comprising electronic components dimensioned for a low duty factor operation with a medium loading capacity of said circuit which corresponds to the usual storage operation with continuous changing of storage accesses, and a monitoring circuit operable to ensure that the selective circuit is not overloaded during continuous access, said monitoring circuit comprising means simulating the thermal state of the selective circuit including a timing circuit comprising resistors and at least one capacitor, said capacitor storing in analog form the succession of loading operations of the associated selective circuit, a threshold circuit connected to said timing circuit for the evaluation of a predetermined critical temperature in response to the analog storage, and means connected to said threshold circuit for limiting the succession of storage operations corresponding to certain addresses within a given period of time.

2. A selective circuit according to claim 1, comprising an AND circuit for the logical linkage of an address signal and a timing signal, said AND circuit having complementary outputs, a pair of transistors in each of a number of partial circuit arrangements having bases, emitters and collectors, said bases connected respectively with the complementary outputs and the emitters of said transistors connected to an operating voltage, a common emitter resistor interposed in the last mentioned connection and included in said timing member which comprises a parallel connected capacitor and a second resistor which is interconnected between the collector of one of said transistors and earth potential, one of said resistors of said timing member including an adjustable tab and said threshold circuit comprising an inverter circuit having an input connected to said adjustable tab.

3. A selective circuit according to claim 2, comprising a pair of said monitoring circuits for evaluating the respective positive and negative address signals of said address bit, a NOR circuit, an output for said monitoring circuit logically linked by said NOR circuit.

4. A selective circuit according to claim 3 comprising a NOR circuit, a pair of circuit arrangements for producing a control signal assigned to an address bit and including emitter resistors each having an adjustable tab connected to the inputs of said NOR circuit.

5. A selective circuit according to claim 4 comprising a NAND circuit having inputs which are connected with the outputs of said circuit arrangements which produce said control signal and an AND circuit having one input connected to the output of said NAND circuit and another input which is adapted to receive an internal control signal indicating that the storage input/output control is ready for a storage operation.

6. A selective circuit according to claim 5 comprising logical linkage networks to receive control signals and operable to evaluate said control signals during a number of storage cycles such that said linkage network emit signals corresponding to the number of the addresses which have been called during a period of time in a statistical order, and comprising threshold circuits to which one of these emitted signals, respectively, is applied and which reduce the rate of storage operations corresponding to the reverse ratio of their ordinal number.

7. A selective circuit according to claim 6, comprising means for producing second control signals including timing members operable to have an increased time delay according to their ordinal numbers, said timing members being dimensioned in a reverse ratio to their ordinal numbers for such reaction delay.

* * * * *